United States Patent [19]

Kalnins et al.

[11] Patent Number: 4,701,247

[45] Date of Patent: Oct. 20, 1987

[54] ELECTROCHEMICAL METHODS FOR BREAKING HIGH VISCOSITY FLUIDS

[75] Inventors: John M. Kalnins; James A. McIntyre; John R. Moyer; Robert F. Phillips; Karel A. J. Snoble, all of Midland, Mich.

[73] Assignee: The Dow Chemical Company, Midland, Mich.

[21] Appl. No.: 892,152

[22] Filed: Jul. 30, 1986

[51] Int. Cl.[4] .......................... C25B 15/08; C25B 1/24
[52] U.S. Cl. ...................................... 204/131; 204/95; 204/128
[58] Field of Search ................... 204/94, 95, 128, 131

[56] References Cited

U.S. PATENT DOCUMENTS

| | | | |
|---|---|---|---|
| 2,483,936 | 10/1949 | Roberts | 252/8.5 |
| 2,935,473 | 5/1960 | King et al. | 204/131 |
| 3,482,636 | 12/1969 | Crowe | 166/307 |
| 3,556,221 | 1/1971 | Haws et al. | 166/305 |
| 3,779,914 | 12/1973 | Nimerick | 252/8.55 R |
| 3,971,706 | 7/1976 | Hirozawa et al. | 204/98 |
| 4,202,795 | 5/1980 | Burnham et al. | 252/332 |
| 4,204,923 | 5/1980 | Carpenter | 204/131 |
| 4,234,433 | 11/1980 | Rhudy et al. | 252/8.55 D |
| 4,240,885 | 12/1980 | Sociv et al. | 204/128 |
| 4,260,463 | 4/1981 | Rideout | 204/128 |
| 4,415,460 | 11/1983 | Sociv et al. | 204/98 |
| 4,415,463 | 11/1983 | Mosier et al. | 252/8.55 R |
| 4,443,307 | 4/1984 | Moore et al. | 204/98 |
| 4,515,699 | 5/1985 | Oliver, Jr. | 252/8.55 R |
| 4,552,675 | 11/1985 | Brown et al. | 252/8.55 R |
| 4,565,640 | 1/1986 | Parks | 252/8.55 R |

*Primary Examiner*—John F. Niebling
*Assistant Examiner*—Terryence Chapman
*Attorney, Agent, or Firm*—Robert W. Selby; Randall A. Davis

[57] ABSTRACT

A method comprising contacting an organic polymer viscosified halide ion-containing, aqueous solution with a sufficient amount of an in situ, electrochemically generated breaker suitable to reduce the viscosity of the solution.

45 Claims, 1 Drawing Figure

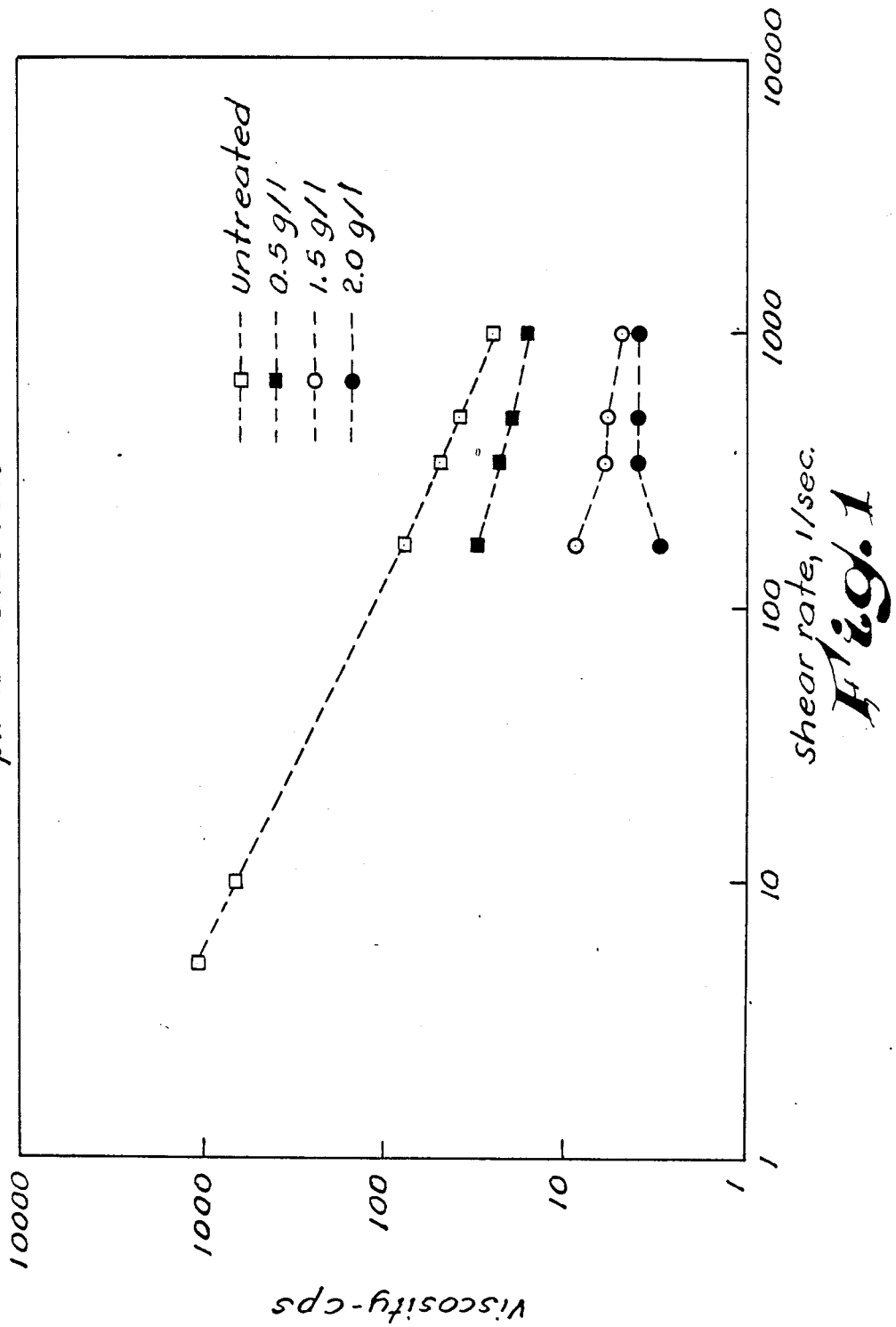

ELECTROCHEMICAL METHODS FOR BREAKING HIGH VISCOSITY FLUIDS

BACKGROUND OF THE INVENTION

This invention relates to electrochemical methods for varying the viscosity of fluids and more particularly to reducing the viscosity of salt-containing aqueous fluids which may be used in drilling fluid, completion fluid, workover, fracturing and other oil and gas stimulation applications.

Clear brine fluids are preferred over fluids such as muds for completion, workover and specialized drilling applications due to their solids-free nature which helps minimize formation damage. When additional solids transport capacity into or out of the wellbore is required or even suspension of fluid loss additives within the brine itself, certain polymers are utilized to provide the extra suspension properties. Oil and gas well operations such as gravel packing, fluid displacement, drilling in and underreaming with fluid loss protection are some examples where this extra solids carrying capacity is required.

An important benefit of using a brine over a mud is that even when contaminated with solids, the brine can easily be cleaned up and reused. Typically, settling, centrifuges, screens and filters can be used to clean up nonviscosified brine fluids.

However, once viscosified, conventional solids removal equipment is ineffective in removing contaminating solids due to the complicating presence of the polymer viscosifier. With filters, for example, polymers can coat out on the cartridges or filter medium producing high pressure drops within short periods of time. In order to efficiently remove undesirable solids from viscosified brines, the viscosity due to the polymer must first be "broken" to reduce the viscosity to near the virgin brine viscosity before conventional solids removal practices can be employed.

Viscosity reduction in brines can be achieved by several classical methods each of which involve cumbersome handling procedures. These methods have been borrowed from the stimulation and fracturing industry and have been modified for the completion and workover market segment. This includes the addition of various bleaches (in either solution or powder form) such as NaOCl, LiOCl and Ca(OCl)$_2$ Lithium hypochlorite, for example, is used in combination with cyanuric acid which stabilizes and slowly releases hypochlorite ion. After adding bleach, the viscosified brine is frequently heated to between 140° F. and 160° F. in order to initiate the viscosity reduction which is difficult to implement in a field location.

Viscosified brines are currently being used for various drilling, completion and workover applications. Once used, the customary practice is to dispose of them by either injection on site into the casing annulus or injecting them into a disposal well. Both practices are expensive since they involve loss of the brine value, trucking and disposal charges.

Conventional methods to reduce the viscosity, or "breaking," fluids typically employ high temperatures, bleaching agents, acids, enzymes and/or strong oxidizing agents. These methods, however, generally require (1) high temperatures which may not be feasible; (2) dilution of a fluid's density; and/or (3) the addition of undesirable chemicals. A convenient method to suitably reduce viscosity of various fluids is desired.

SUMMARY OF THE INVENTION

The present invention is a method comprising contacting an organic polymer viscosified halide ion-containing, aqueous solution with a sufficient amount of an in situ electrochemically generated breaker suitable to reduce the viscosity of the solution.

DESCRIPTION OF THE DRAWING

The accompanying drawing further illustrates the invention. In FIG. 1 is shown the effect of bromine dosage upon the viscosity at varying shear rates.

DETAILED DESCRIPTION

"Viscosity" as used herein is broadly defined as the internal resistance to flow and may be measured by standard test procedures. The viscosity at a given temperature indicates behavior patterns of the fluid such as pumping characteristics, rate of flow and wetting properties.

The term "breaker" whenever used herein refers to a chemical species in an amount sufficient to reduce the viscosity of a solution of water and a halide salt (commonly referred to as a "brine") thickened with a viscosifying polymer. The term "breaking" is used to identify the processes in which the viscosity of a brine is reduced. A "complete break" refers to the viscosity reduction of the viscous solution to about the viscosity level of the nonviscosified solution, as measured by the test condition given below or by a comparable test.

The compositions and methods described herein are not generally ultrasensitive to small variances in proportions. Thus, the compositions and methods are suitable for field requirements and do not require the exacting preciseness of laboratory formulations and procedures. Furthermore, contaminants and other nonaqueous substances generally found in used brines from the recovery of oil and gas from wells have not been found to deleteriously affect the benefit derived from the present invention.

Brines containing viscosifying polymers which are substantially soluble and/or dispersible in the brine and form a viscous system, can generally be broken by employment of this invention. Preferably, the viscosifying polymer is substantially water-soluble and/or water-dispersible and forms a viscous aqueous system. Preferred viscosifying polymers for this invention include water-soluble synthetic polymers, water-soluble derivatives of cellulose, water-soluble polysaccharides and mixtures thereof.

Water-soluble synthetic polymers include, but are not limited to, polyacrylamide, polyacrylate, polyacrylic acid and derivatives thereof. Water-soluble polysaccharide cellulose derivatives include, but are not limited to, hydroxyethylcellulose, carboxymethylhydroxyethylcellulose, carboxymethylcellulose, alkylcellulose and derivatives thereof. Suitable water-soluble polysaccharides further include, but are not limited to, xanthan gum, guar gum, locust bean gum, tragacanth gum and derivatives thereof. The preferred polymers are hydroxyethylcellulose and xanthan gum. Included in this invention is the breaking of any viscosified fluid containing any combination of the above-described polymers.

The amount of viscosifying polymer to be employed in the viscous solution depends on the desired viscosity of the solution, the temperature of the solution in use and the particular viscosifying polymer used. The viscosifying polymer is preferably employed in an amount ranging from about 10 to about 200 pounds per 1,000 gallons of solution and more preferably from about 20 to about 80 pounds of viscosifying polymer per 1,000 gallons of solution.

The viscosified solution contains a salt which forms halide anions in the fluid. Preferred salts include calcium chloride, calcium bromide, sodium bromide, sodium chloride, potassium bromide, potassium chloride, zinc bromide, zinc chloride, lithium bromide, lithium chloride and combinations thereof. More preferred salts are calcium chloride, calcium bromide, sodium bromide, potassium bromide, zinc bromide and combinations thereof.

The amount of salt present is not critical, but is generally employed in amounts sufficient to produce a final solution with a density of up to about 23 pounds per gallon (ppg) and preferably from about 8½ to about 20 ppg. The herein described breaking methods usually do not substantially affect the density of the solution. Therefore, the salt-containing solution may not need to be reweighted with additional salt prior to reviscosification and reuse.

The breaker employed in this invention comprises a halogen species selected from the group consisting of $X_{O2}$, $X_3$, $OX^-$ and $HOX$ where $X$ is a halogen. Included within the scope of this invention are the mixed halogen species, as $BrCl$, $IBr$, $ICl$, $Br_2Cl^-$, $Br_2I^-$, $BrCl_2^-$ $BrI_2^{31}$. In practice, the composition of a halogen-containing solution can simultaneously consist of several different species: for example, $X_2$, $X_3^-$, $HOX$ and $OX^-$. The concentrations of the individual species present in the solution will vary depending at least partially upon the total halide ion concentration and the pH of the solution. The The preferred halogen species are $BR_2$, $Br_3^-$, $HOBr$ and $OBr^-$.

In the present invention, the pH of the solution at least partially determines the manner and rate in which the viscosity is reduced. Generally, in the present invention, in a viscosified solution containing, for example, hydroxyethyl cellulose, with a pH of 7 and lower, the viscosity of the solution is reduced by precipitation of the viscosifying polymer, such as hydroxyethylcellulose, when a breaker is added by electrolysis to the solution. Some viscosifying polymers, such as xanthan gum, may not form a precipitate under similar acid pH conditions. For example, the viscosity of a solution thickened with, for example, xanthan gum and guar gum may not be reduced under acidic conditions; however, if the pH of the solution is greater than 7, and preferably at least about 10, the viscosity of the solution may be reduced without forming a precipitate when the breaker is formed in situ in the solution. Adjustment of the pH to alkaline (i.e., basic) can be carried out at any desired time and such time is not critical to the present invention.

The procedures to measure the pH of solutions containing high concentrations of salt are well known; see, for example, an article authored by A. J. Pasztor and J. S. Snover, entitled "How to Treat Metal Contamination from Heavy Clear Brines," Oil and Gas Journal, Jul. 18, 1983, pp. 140-146.

The breaker is present in an amount sufficient to reduce the viscosity of the solution, and preferably, to reduce the viscosity to a level suitable to permit removal of contaminating solids by conventional solids control systems. More preferably, the viscosity is reduced to about the viscosity of the solution prior to viscosification with a polymer. The amount of breaker to be employed will vary depending upon, for example, the composition of the the viscosifying polymer used and its concentration in the solution, the type and amount of salts present, the pH of the viscosified solution and the temperature of the solution. Thus, it is apparent that the preferred concentration range for the breaker will vary and can be readily determined. Typically, however, the amount of breaker used is from about 0.1 to about 10 grams per liter of solution and preferably from about 0.5 to about 2.5 grams per liter of solution.

The breaker, in the typical applications contemplated, may be preferably used in proportions of about 0.05 to about 0.5 grams per gram of viscosifying polymer. The optimum proportion will be widely variable depending upon the factors described above.

In this invention, the viscosity of the viscosified solution can, if desired, be reduced to about the viscosity level of the solution prior to viscosification with a polymer. Clearly the viscosity of the aqueous halogen salt solution or brine will vary, even without a polymer being present, depending upon the type and concentration of the salt. Preferably, though the viscosity is reduced to less than about 30 centipoise and more preferably to less than about 10 centipoise at about 25° C. over a range of shear rates from about 100 to about 5,400 $sec^{-1}$.

The breaker should be in contact with the solution for a sufficient period of time to reduce the viscosity. The time variable is at least partially dependent upon the amount of breaker utilized, the temperature and pH of the solution and the amount of viscosifying polymer present. These methods of breaking are believed to be relatively rapid as compared to many other generally known methods of breaking.

The present electrolytic breaking process is practiced at any temperature sufficient to permit the solution to be in a substantially liquid state, and the breaking process preferably is carried out at temperatures between about −20° C. and about 65° C., more preferably between about 4° C. and about 30° C. This breaker system clearly may be used at ambient temperatures and at temperatures less than about 10° C. The rate of viscosity reduction is somewhat dependent upon temperature and such rate may increase with ascending fluid temperatures, thereby requiring less breaker to accomplish the same viscosity reduction in a similar period of time.

The breaker is generated in an electrolytic cell containing a viscosified salt-containing aqueous fluid as the electrolyte. Preferably, a viscosified, halide salt-containing aqueous solution is introduced into an undivided electrolytic cell wherein the solution is in direct contact with the cathode and anode of the cell and forms the sole electrolyte of the cell, and passing a direct current of electricity through said cell. During electrolysis, the viscosifier may deposit on the anode of the cell and, when this occurs, the deposited viscosifying polymer can be intermittently or, preferably continuously removed from the anode. Some viscosifying polymers, such as hydroxyethylcellulose, may form a precipitate on the anode while other viscosifying polymers, such as xanthan gum, generally do not precipitate on the anode. A more preferred method comprises continuously introducing the solution into the electrolytic cell and continuously removing about an equal portion of deviscosified solution from the cell to maintain a substantially constant level of electrolyte in the cell.

Another preferred method comprises continuously flowing a viscosified, halide salt-containing aqueous solution through the electrolytic cell in such a manner that the direction of flow of the solution will permit at least a portion, and preferably substantially all of the solution to be in direct contact with first The direction of the flow of the solution through the cell is preferably substantially parallel to the flow of electricity through the solution.

By suitable control of volume and velocity of the solution being treated and by control of the electric current, the viscosity of the solution can be reduced without substantially affecting the final salt composition or concentration of the aqueous fluid. This results in the retention of desirable properties (e.g., density). In addition, deposit of the viscosifying polymer on the anode can be minimized by control of these same factors.

The preferred flow rate will vary depending on the size of the electrolytic cell, the amount of current utilized and the amount of breaker that needs to be generated to break a particular viscosified fluid or solution. The direction of the fluid flow may be substantially parallel to the flow of electricity. As aforementioned, the viscosified fluid preferably contacts the cathode prior to the anode during operation of the cell. This sequence of viscosified fluid passing through the cell reduces the tendency of certain viscosifying polymers to be deposited onto the anode. The geometry of the cell to affect the cathode-anode contacting sequence is believed to permit electrode stacking and the fabrication of compact cells. It will be understood that a plurality of electrolytic cells can be used either in series or in parallel as desired.

The amount of electric current to be employed in reducing the viscosity of the solution is variable, being determined largely by the concentration of the viscosifying polymer, the rate at which the viscosity is reduced and the quantity and rate of flow through the electrolytic cell.

Following reduction of the viscosity, the solution may be filtered by conventional solids control systems such as screens, filters and centrifuges; to remove any undesired solids which may have accumulated during prior use. Upon removal of those contaminating solids, the solution can, if desired, be reviscosified and reused.

EXAMPLES

The following examples further illustrate the practice of the present invention but do not limit the scope of this invention. All viscosities are measured by a Haake Rotovisco viscometer and are reported in centipoise over a range of shear rates at about 25° C. unless stated otherwise. Temperatures are in degrees Centigrade. Weights typically are expressed in pounds per gallon (ppg) of fluid and also in laboratory scale quantities. Salts are represented by their common chemical abbreviations. Amounts of viscosifying polymers are expressed in pounds per barrel (ppb) of fluid wherein the barrel contains about 42 U.S. gallons. A "broken" solution is one which exhibits water-like consistency upon visual inspection. A "used" solution is one which contains contaminating solids accumulated during use in the recovery of gas or oil from wells. Viscosifying polymers hydroxyethylcellulose and xanthan gum are abbreviated HEC and XC, respectively.

EXAMPLE 1

A sodium bromide/sodium chloride aqueous solution (11.5 ppg) viscosified with hydroxyethylcellulose (3 ppb) is continuously pumped through an electrolytic cell (0.65 ml/min) while a direct electrical current (0.7 amperes and about 4 volts) is passed through the cell. The electrolytic cell is constructed of a rotating cylindrical anode (graphite rod, 1 inch diameter×2 inches long) mounted by polytetrafluoroethylene bushings for rotation about a generally horizontal axis coinciding with the longitudinal axis of the electrode, a cathodic nickel tank encasing the anode with an electrode separation of 0.125 inches and a plexiglas scraper positioned to engage the surface of the anode and remove viscosifying polymer deposited on the anode. The viscosity of the aqueous solution is reduced over a shear rate range of 175 to 5,400 cm$^{-1}$ from 440 to 16 centipoise to 3.9 to 2.4 centipoise.

EXAMPLES 2-11

Various viscosified salt-containing aqueous solutions are electrolyzed in an electrolytic cell constructed substantially the same as in Example 1. The viscosity of the solution is measured prior to being electrolyzed, as shown by comparative Examples A-E, and after being electrolyzed, as shown by Examples 2-11. The composition of the treated solutions and the method of treating the fluid is given in Table I. The results of the electrolytic treatment are compiled in Table II. Comparative Examples C and D contain contaminating solids accumulated during use in field operations. Examples C and D are filtered to remove the solids following the viscosity reduction, but prior to taking the viscosity measurements.

TABLE I

| Example | Composition | Electricity Passed | Flow Rate |
| --- | --- | --- | --- |
| Comparative A | NaBr/KCl(11.5 ppg) HEC (3 ppg) | Untreated | — |
| 2 | Same as Above | 0.9 Coulombs/ml | — |
| 3 | Same as Above | 1.2 Coulombs/ml | — |
| 4 | Same as Above | 1.5 Coulombs/ml | — |
| 5 | Same as Above | 3.0 Coulombs/ml | — |
| Comparative B | CaBr$_2$/CaCl$_2$(13 ppg) HEC (3 ppb) | Untreated | — |
| 6 | Same as Above | 0.3 amperes | 0.36–0.64 ml/min |
| Comparative C | NaBr/NaCl HEC/XC | Untreated | — |
| 7 | Same as Above | 0.7 amperes | 1.3 ml/min |
| Comparative D | ZnBr$_2$/CaBr$_2$/CaCl$_2$ HEC | Untreated | — |
| 8 | Same as Above | 0.3 amperes | 0.8 ml/min |
| Comparative E | NaBr/NaCl(11.5 ppg) | Untreated | |

TABLE I-continued

| Example | Composition | Electricity Passed | Flow Rate |
|---|---|---|---|
| | XC (2 ppb) | | |
| 9 | Same as Above | 23 Coulombs/ml | — |
| 10 | Same as Above | 38 Coulombs/ml | — |
| 11 | Same as Above | 46 Coulombs/ml | — |

TABLE II

| Comparative Example A | | Example 2 | | Example 3 | | Example 4 | | Example 5 | |
|---|---|---|---|---|---|---|---|---|---|
| Log Shear Rate, Sec$^{-1}$ | Viscosity cps | Log Shear Rate, Sec$^{-1}$ | Viscosity cps | Log Shear Rate, Sec$^{-1}$ | Viscosity cps | Log Shear Rate, Sec$^{-1}$ | Viscosity cps | Log Shear Rate, Sec$^{-1}$ | Viscosity cps |
| 18 | 1841 | 5 | 2540 | 172 | 8 | 172 | 5 | 172 | 2 |
| 37 | 1199 | 21 | 1352 | 345 | 9 | 689 | 5 | 689 | 3 |
| 75 | 743 | 86 | 594 | 689 | 8 | 975 | 5 | 975 | 3 |
| 150 | 456 | 172 | 367 | 975 | 8 | 1379 | 5 | 1379 | 3 |
| 300 | 277 | 345 | 227 | 1379 | 8 | 1951 | 5 | 1951 | 3 |
| 425 | 210 | 689 | 139 | 1951 | 8 | 2759 | 5 | 2759 | 3 |
| 601 | 161 | 975 | 110 | 2759 | 6 | 3902 | 6 | 3902 | 3 |
| 850 | 124 | 1379 | 86 | 3902 | 8 | 5390 | 5 | 5390 | 4 |
| 1203 | 96 | 1951 | 69 | 5390 | 8 | | | | |
| 1701 | 75 | 2759 | 54 | | | | | | |
| 2350 | 60 | 3902 | 43 | | | | | | |

| Comparative Example B | | Example 6 | | Comparative Example C | | Example 7 | | Comparative Example D | |
|---|---|---|---|---|---|---|---|---|---|
| Log Shear Rate, Sec$^{-1}$ | Viscosity cps | Log Shear Rate, Sec$^{-1}$ | Viscosity cps | Log Shear Rate, Sec$^{-1}$ | Viscosity cps | Log Shear Rate, Sec$^{-1}$ | Viscosity cps | Log Shear Rate, Sec$^{-1}$ | Viscosity cps |
| 5 | 5891 | 172 | 5 | 21 | 114 | 345 | 1 | 5 | 5379 |
| 10 | 3794 | 345 | 5 | 86 | 77 | 689 | 2 | 10 | 3426 |
| 21 | 2329 | 689 | 5 | 172 | 57 | 975 | 2 | 43 | 1268 |
| 43 | 1448 | 975 | 5 | 345 | 41 | 1379 | 2 | 172 | 452 |
| 86 | 874 | 1379 | 5 | 689 | 33 | 1951 | 2 | 689 | 167 |
| 172 | 528 | 1951 | 5 | 975 | 27 | 2759 | 2 | 975 | 132 |
| 345 | 317 | 2759 | 5 | 1379 | 23 | 3902 | 2 | 1379 | 105 |
| 689 | 196 | 3902 | 5 | 1951 | 19 | 5390 | 2 | 1951 | 84 |
| 975 | 159 | 5390 | 5 | 2759 | 16 | | | 2759 | 68 |
| 1379 | 127 | | | 3902 | 14 | | | | |
| | | | | 5390 | 12 | | | | |

| Example 8 | | Comparative Example E | | Example 9 | | Example 10 | | Example 11 | |
|---|---|---|---|---|---|---|---|---|---|
| Log Shear Rate, Sec$^{-1}$ | Viscosity cps | Log Shear Rate, Sec$^{-1}$ | Viscosity cps | Log Shear Rate, Sec$^{-1}$ | Viscosity cps | Log Shear Rate, Sec$^{-1}$ | Viscosity cps | Log Shear Rate, Sec$^{-1}$ | Viscosity cps |
| 86 | 3 | 18 | 328 | 43 | 136 | 86 | 20 | 345 | 4 |
| 172 | 4 | 37 | 195 | 86 | 82 | 172 | 13 | 689 | 3 |
| 345 | 5 | 75 | 115 | 172 | 52 | 345 | 10 | 975 | 3 |
| 689 | 5 | 150 | 72 | 345 | 34 | 689 | 7 | 1379 | 3 |
| 975 | 5 | 300 | 49 | 689 | 23 | 975 | 6 | 1951 | 3 |
| 1379 | 5 | 425 | 39 | 975 | 16 | 1379 | 5 | 2759 | 3 |
| 1951 | 4 | 601 | 32 | 1379 | 13 | 1951 | 5 | 3902 | 3 |
| 2759 | 4 | 850 | 27 | 1951 | 11 | 2759 | 4 | 5390 | 3 |
| 3902 | 5 | 1203 | 22 | 2759 | 10 | 3902 | 4 | | |
| 5390 | 5 | 1701 | 18 | 3902 | 9 | 5390 | 3 | | |
| | | 2350 | 17 | 5390 | 8 | | | | |

Examples 2-11 clearly show that the electrolytically generated hypohalite reduces the viscosity of both hydroxyethylcellulose and xanthan gum viscosified fluids containing no contaminating solids and also those fluids containing contaminating solids accumulated during field operations.

EXAMPLE 12

A solution of water, sodium bromide and sodium chloride (11.5 ppg) viscosified with hydroxyethylcellulose (2 ppb) is pumped through an electrolytic cell (140 ml/min) while passing direct electrical current (4 amperes at about 3.5 volts per electrode pair) through said cell. The cell utilizes 2 titanium mesh anodes coated with an electroactive oxide of ruthenium and 2 nickel plated steel punch plate cathodes (6.5 cm2 cross-sectional area) spaced alternately (0.64 cm apart) in a polymethylmethacrylate cell body. The viscosity of the treated solution is reduced over a shear rate range of 175 to 5,400 cm$^{3}$$^{1}$ $^{1}$ at 21° C. from 440 to 16 to 3.3 to 3.5 centipoise.

EXAMPES 13-15

A 50 ml sample of a brine solution containing sodium bromide (3.9 molar), sodium chloride (2.4 molar) and 0.4 percent by weight of xanthan gum (Kelzan XCD) is placed in an electrolysis cell. Direct current is passed through the cell using a graphide rod as anode and a stainless steel rod cathode until the equivalent of 0.5 g/l of bromine has been generated. The current is 250 milliamps and cell voltage is about 3 volts. The pH of the brine solution is raised to about 12 by the addition of a 50 percent by weight sodium hydroxide solution. This procedure is repeated for similar samples in which the equivalent of 1.5 and 2.0 g/l of bromine are generated. For these 3 samples, plus an untreated sample of the same brine solution, the viscosity is measured by means of a Fann Model 35 Viscometer. The viscosity measurements as shown in FIG. 1 show that the electrolytic treatment is effective in reducing the viscosity, and that the decrease in viscosity is related to the amount of bromine generated in the sample.

What is claimed is:

1. In a method for reducing the viscosity of viscosified brines used in drilling, completion workover, fracturing and other oil and gas stimulation applications, the improvement comprising contacting an organic polymer viscosified halide ion-containing, aqueous solution with a sufficient amount of an in situ, electrochemically generated breaker suitable to reduce the viscosity of the solution.

2. The method of claim 1 wherein the polymer is a polysaccharide.

3. The method of claim 2 wherein the breaker is at least one halogen species selected from the group consisting of $X_2, x_3^-$, $OX^-$ and HOX where X is a halogen. consisting of $X_2$, $X_3^-$, $OX^-$ and HOX where X is a halogen.

4. The method of claim 2 including maintaining the alkalinity of the solution by generating the breaker in an undivided electrolytic cell.

5. The method of claim 2 wherein the viscosity is reduced sufficiently to afford removal of solids from the solution.

6. The method of claim 2 including adding a sufficient amount of a base to the anode compartment of an electrolytic cell with an anode spaced apart from a cathode by an ion-permeable separator to maintain the solution in the anode compartment alkaline.

7. The method of claim 2 wherein the viscosity is reduced to about the viscosity of the solution prior to viscosification with the polymer.

8. The method of claim 2 wherein the polymer is substantially entirely soluble in the solution.

9. The method of claim 2 wherein the halogen is selected from at least one member of the group consisting of bromine, fluorine and iodine.

10. The method of claim 2 wherein the halogen is bromine.

11. The method of claim 2 wherein the halogen species is at least one member selected from the group consisting of $X_2$, $X_3^-$, $OX^-$ and HOX.

12. The method of claim 2 wherein the solution contains a salt.

13. The method of claim 12 wherein the salt is at least selected from the group consisting of bromide, chloride, iodide and fluoride.

14. The method of claim 12 wherein the salt is selected from the group consisting of chloride salts.

15. The method of claim 12 wherein the salt is a bromide salt.

16. The method of claim 12 wherein the solution is aqueous.

17. The method of claim 16 wherein the polymer is hydrooxyethylcellulose.

18. The method of claim 13 wherein the polymer is a xanthan gum.

19. The method of claim 16 wherein the temperature of the solution is less than about 10° C.

20. The method of claim 16 wherein the temperature of the solution is between about −20° C. about 65° C.

21. The method of claim 16 wherein the temperature of the solution is between about 4° C. and about 30° C.

22. The method of claim 1 wherein the organic polymer is selected from water soluble members of synthetic polymers, cellulose derivatives, polysaccharides and mixtures thereof.

23. The method of claim 1 wherein the organic polymer is at least one water soluble member selected from the group consisting of polyacrylamide, polyacrylate, polyacrylic acid, hydroxyethylcellulose, carboxymethylhydroxyethylcellulose, carboxymethylcellulose, alkylcellulose, xanthan gum, guar gum, locust bean gum, tragcanth gum, and derivatives thereof.

24. The method of claim 1 wherein the organic polymer is present in an amount of from about 10 to about 200 pounds per 000 gallons of the solution.

25. The method of claim 1 wherein the organic polymer is present in an amount of from about 20 to about 80 pounds per 1,000 gallons of the solution.

26. The method of claim 1 wherein the breaker is present in an amount of from about 0.1 to about 10 grams per liter of solution.

27. The method of claim 1 wherein the breaker is present in an amount of from about 0.5 to about 2.5 grams per liter of solution.

28. The method of claim I wherein the breaker is present in an amount of from about 0.05 to about 0.5 grams per gram of polymer in the solution.

29. In a method for reducing the viscosity of viscosified brines used in drilling, completion workover, fracturing and other oil and gas stimulation application, the improvement comprising:

introducing a polysaccharide viscosified, halide salt-containaing fluid into an undivided electrolytic cell as the sole electrolyte for the cell, whereby the electrolyte being in direct contact with an anode and a cathode of the cell, passing a sufficient amount of direct electrical current through said cell to generate a halogen species selected from the group consisting of $X_2X_3-$, OX− and HOX where X is a hologen.

30. The method of claim 29 including depositing at least a portion of the polymer on the anode and, continuously removing the deposited polymer from the anode.

31. The method of claim 29 wherein in the solution is continuously introduced into the electrolytic cell and a halogen species treated, halide salt-containing solution with a lower viscosity than was introduced into the cell is continuously removed from the cell.

32. The method of claim 29 wherein the viscosifying polymer is hydroxyethylcellulose.

33. The method of claim 22 wherein the solution contact the cathode before contacting the anode.

34. The method of claim 31 wherein the density of the solution is substantially the same before and after reduction of the viscosity.

35. The method of claim 31 wherein the electrolyzed solution is filtered to remove solids following removal of the solution from the cell.

36. The method of claim 35 wherein the filtered solution is reviscosified with a polymer.

37. The method of claim 31 wherein the electrolyzed solution is reviscosified with a polymer.

38. The method of claim 32 wherein the pH of the solution in the cell is maintained sufficiently acidic to precipitate at least a portion of the viscosifying polymer.

39. The method of claim 29 wherein the polymer is a xanthan gum.

40. The method of claim 29 including adjusting the pH of the viscosified solution to a sufficient alkaline pH to further reduce the viscosity of the solution.

41. The method of claim 40 wherein the polymer is a xanthan gum.

42. The method of claim 29 wherein the liquid is alkaline during at least a portion of the contacting step.

43. The method of claim 42 wherein the pH is at least 10.

44. The method of claim 43 wherein the polymer is xanthan gum.

45. The method of claim 31 including the additional step of introducing the treated solution into a wellbore.

* * * * *

UNITED STATES PATENT AND TRADEMARK OFFICE
CERTIFICATE OF CORRECTION

PATENT NO. : 4,701,247

DATED : October 20, 1987

INVENTOR(S) : John M. Kalnins, James A. McIntyre, John R. Moyer, Robert F. Phillips and Karel A. J. Snoble It is certified that error appears in the above-identified patent and that said Letters Patent is hereby corrected as shown below:

Col. 3, line 28, "$X_{02}$" should read -- $X_2$ -- and "$X_3$" should read -- $X_3^-$ --;

line 31, after "$BrCl_2^-$" insert -- and --; "$BrI_2^{31}$" should read -- $BrI_2^-$ --;

line 37, delete first occurrence of "The".

Col. 5, line 8, after "first" insert -- the negative cathode and thereafter the positive anode. --.

Col. 7, line 65, "cm2" should read -- $cm^2$ --.

Col. 8, line 49, "$cm^{31\ 1}$" should read -- $cm^{-1}$ --;

line 57, "graphide" should read -- graphite --.

Col. 9, line 6 (Claim 1), insert a comma between "completion" and "workover";

lines 16-17 (Claim 3), delete "consisting of $X_2$, $X_3^-$, $OX^-$ and HOX where X is a halogen.";

line 56 (Claim 17), "hydrooxyethylcellulose" should read -- hydroxyethylcellulose --;

line 62 (Claim 20), insert -- and -- after "-20°C.".

UNITED STATES PATENT AND TRADEMARK OFFICE
CERTIFICATE OF CORRECTION

PATENT NO. : 4,701,247

DATED : October 20, 1987

INVENTOR(S) : John M. Kalnins, James A. McIntyre, John R. Moyer, Robert F. Phillips and Karel A. J. Snoble It is certified that error appears in the above-identified patent and that said Letters Patent is hereby corrected as shown below:

Col. 10, line 7 (Claim 23), "tragcanth" should read -- tragacanth --;

line 10 (Claim 24), "000" should read -- 1,000 --;

line 24 (Claim 29), insert a comma between "completion" and "workover";

line 25 (Claim 29), insert an -- s -- at the end of "application";

line 28 (Claim 29), "containaing" should read -- containing --;

line 34 (Claim 29), "$X_2X_{3-}$" should read -- $X_2$, $X_3^-$ --;

line 35 (Claim 29), "hologen" should read -- halogen --;

line 41 (Claim 31), delete "in";

line 48 (Claim 33), "22" should read -- 29 --.

Signed and Sealed this

Tenth Day of May, 1988

Attest:

DONALD J. QUIGG

*Attesting Officer*      *Commissioner of Patents and Trademarks*